United States Patent
Horie et al.

[19]

[11] Patent Number: 6,160,375

[45] Date of Patent: Dec. 12, 2000

[54] CHARGE CONTROLLING DEVICE AND METHOD FOR MULTI-CELL BATTERY, AND ELECTRIC VEHICLE PROVIDED WITH CHANGE CONTROLLING

[75] Inventors: Hideaki Horie, Yokosuka; Toyoaki Nakagawa, Chigasaki; Mikio Kawai, Yokosuka; Yuji Tanjo, Yokohama; Takaaki Abe; Ken Iwai, both of Yokosuka, all of Japan

[73] Assignee: Nissan Motor Co., Ltd., Yokohama, Japan

[21] Appl. No.: 09/310,584

[22] Filed: May 12, 1999

[30] Foreign Application Priority Data

May 14, 1998 [JP] Japan ................................. 10-132181

[51] Int. Cl.[7] ...................................................... H02J 7/00
[52] U.S. Cl. ...................... 320/116; 320/119; 320/122; 429/90
[58] Field of Search .................................. 320/116, 122, 320/119, 162; 429/90, 224

[56] References Cited

U.S. PATENT DOCUMENTS

| | | | |
|---|---|---|---|
| 4,614,905 | 9/1986 | Petersson et al. | 320/122 |
| 5,578,914 | 11/1996 | Morita | 320/122 |
| 5,629,601 | 5/1997 | Feldstein | 320/119 |
| 5,738,957 | 4/1998 | Amine et al. | 429/223 |
| 5,910,723 | 6/1999 | Perelle | 320/119 |
| 5,982,050 | 11/1999 | Matsui | 307/10.1 |

FOREIGN PATENT DOCUMENTS 9-84274  3/1997  Japan .

*Primary Examiner*—Shawn Riley
*Assistant Examiner*—Gregory J. Toatley Jr.
*Attorney, Agent, or Firm*—Foley & Lardner

[57] ABSTRACT

This invention relates to a lithium ion multi-cell battery (15) wherein plural lithium ion cells ($C_n$) are arranged in series. Each cell comprises a positive electrode of manganese/spinal oxide and a negative electrode. A first Zener diode ($Z_n1$) and first resistor ($R_n1$) are connected in series between the electrodes. By setting the Zener voltage (VZ1) of the first Zener diode ($Z_n1$) equal to the cell voltage VL of the responding cell ($C_n$) when positive electrode crystal phase transport stars in that cell ($C_n$), the charge amount of each cell is made uniform.

9 Claims, 4 Drawing Sheets

CHARGE CONTROLLING DEVICE AND METHOD FOR MULTI-CELL BATTERY, AND ELECTRIC VEHICLE PROVIDED WITH CHANGE CONTROLLING

FIELD OF THE INVENTION

This invention relates to uniformization of the charge amount of cells in a multi-cell battery.

BACKGROUND OF THE INVENTION

Tokkai Hei 9-84274 published by the Japanese Patent Office in 1995 discloses a multi-cell battery, wherein, when the terminal voltage of a cell exceeds a predetermined value, the charging current is re-routed to a bypass circuit so that the charge amount of each cell is made uniform.

SUMMARY OF THE INVENTION

The charging controller in the aforesaid prior art technique requires the use of complex, costly voltage detecting circuits and a bypass circuit. It was therefore uneconomical to apply this type of controller to electric vehicles or hybrid vehicles, which use a large number of battery cells.

In the aforesaid controller, moreover, the voltage detecting circuit requires a high operating current, or so called dark current, and losses due to discharge are also large.

It is therefore an object of this invention to provide a simple and economical controller that makes the charge amount of cells in a multi-cell battery uniform.

It is a further object of this invention to reduce a dark current of the voltage detecting circuit.

It is yet a further object of this invention to reduce the deterioration of a battery.

In order to achieve the above objects, this invention provides a charge amount controller for use with a lithium ion multi-cell battery wherein plural lithium ion cells each of which is provided with a positive electrode of manganese/spinel oxide and a negative electrode are arranged in series.

The controller comprises a first circuit comprising a first Zener diode and first resistor connected in series. This first circuit is connected between the positive electrode and negative electrode of each of the lithium ion cells, and the Zener voltage of the first Zener diode is set to be substantially equal to a cell voltage of a corresponding lithium ion cell when positive electrode crystal phase transport starts in the corresponding lithium ion cell.

This invention also provides a charge amount control method for a lithium ion multi-cell battery wherein plural lithium ion cells each of which is provided with a positive electrode of manganese/spinel oxide and a negative electrode are arranged in series,. The method comprises connecting a first circuit, comprising a first Zener diode and a first resistor connected in series, between the positive and negative electrodes of each of the cells and setting a Zener voltage of the first Zener diode substantially equal to a cell voltage of a corresponding lithium ion cell when positive electrode crystal phase transport starts in the corresponding lithium ion cell.

This invention also provides s vehicle which runs under the power of an electric motor. The vehicle comprises a lithium ion multi-cell battery for supplying power to the motor. The battery comprises plural lithium ion cells connected in series. Each of the cells is provided with a positive electrode of manganese/spinel oxide, a negative electrode, and a series circuit comprising a first Zener diode and a first resistor connected in series between the positive and negative electrodes. A Zener voltage of the first Zener diode is set to be substantially equal to a cell voltage of a corresponding lithium ion cell when positive electrode crystal phase transport starts in the corresponding lithium ion cell.

The details as well as other features and advantages of this invention are set forth in the remainder of the specification and are shown in the accompanying drawings.

DESCRIPTION OF THE PREFERRED EMBODIMENTS

Figure 1:
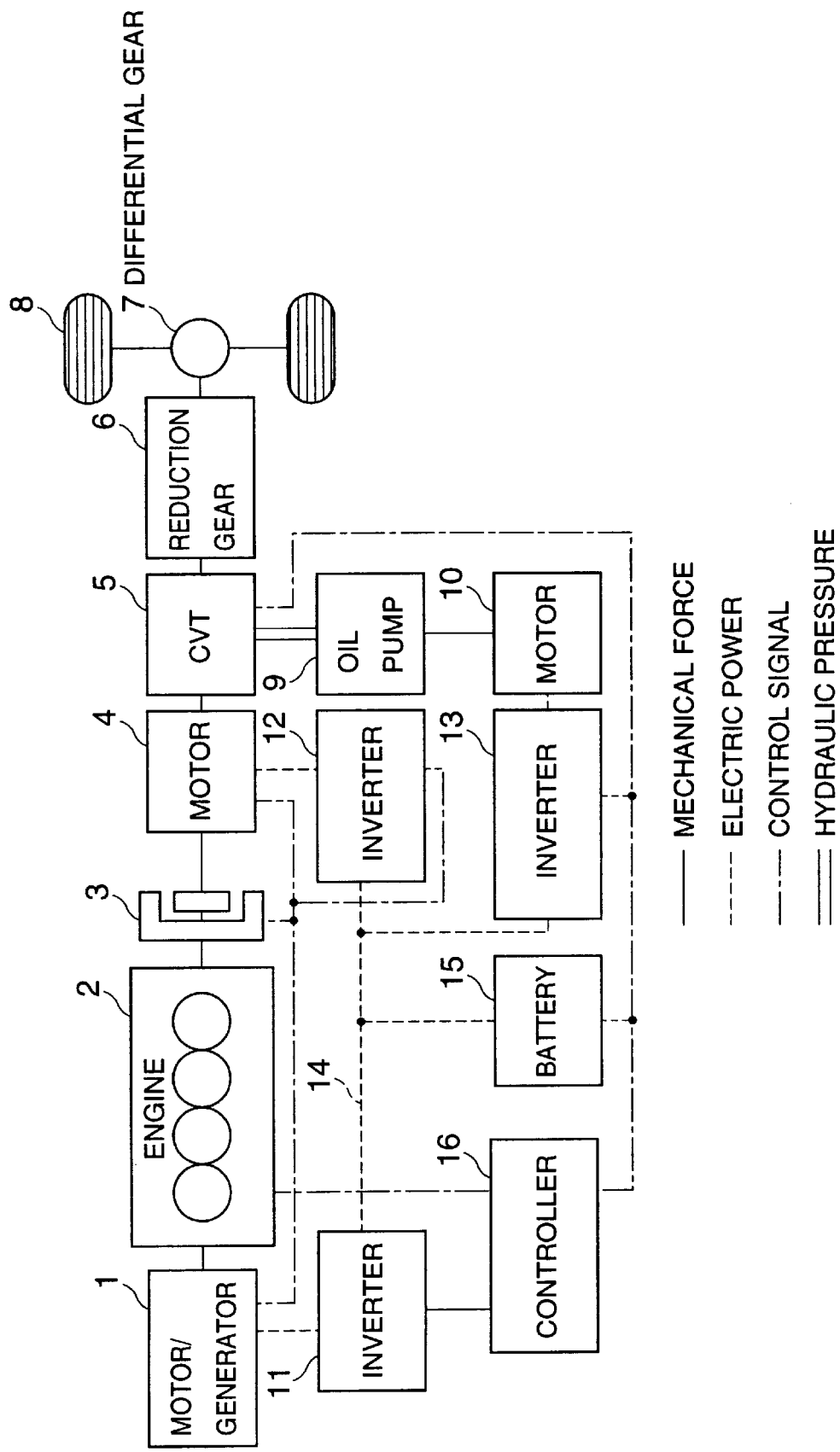
FIG. 1 is a schematic diagram of a drive system of a hybrid vehicle according to this invention.

Referring to FIG. 1 of the drawings, a hybrid vehicle to which this invention is applied drives drive wheels 8 using the power of an engine 2 and motor 4.

The motor 4 is connected to an input shaft of a continuously variable transmission (CVT) 5.

The output shaft of the engine 2 is joined to a rotating shaft of the motor 4 via a clutch 3.

The output of the continuously variable transmission 5 is transmitted to the drive wheels 8 via a reduction gear 6 and a differential gear 7.

When the clutch 3 is engaged, therefore, the drive wheels 8 rotate due to a rotation torque of the engine 2 and motor 4, and when the clutch 3 is disengaged, the drive wheels 8 rotate due only to the rotation torque of the motor 4

The continuously variable transmission 5 varies a speed ratio according to an oil pressure supplied from an oil pump 9 driven by a motor 10.

A motor/generator 1 is joined to the engine 2.

Due to a supply current from a battery 15, the motor/generator 1 functions as a starter motor for starting the engine 2, and functions as a generator to charge the battery 15 when the engine 2 is running.

The motor/generator 1 and motor 4, 10 are AC devices such as a triphase synchronous motor or triphase induction motor.

If a motor/generator is applied to the motor 4, electricity is generated by the rotation torque of the drive wheels 8 when the vehicle is slowing down, and a regenerative braking force based on the rotation resistance at this time may also be arranged to apply to the drive wheels 8.

The clutch 3 is an electromagnetic powder clutch which can regulate the transmission torque, but a dry type sheet clutch or wet type multiple disc clutch can also be used.

The motor/generator 1 and motor 4, 10 are respectively controlled by inverters 11, 12 and 13.

DC current motors may also be used for the motor/generator 1 and motor 4, 10. In this case, DC /DC converters may be used instead of the inverters 11, 12 and 13.

The inverters 11, 12 and 13 are connected to the battery 15 via a common DC link 14.

The inverters 11, 12 and 13 convert DC power stored in the battery 15 to AC power, and supply this to the motor/generator 1 and motor 4,10.

The inverter 11 also converts AC power generated by the motor/generator 1 and charges the battery 15.

If the motor 4 performs regenerative braking as described above, the power generated by the motor 4 during regenerative braking may be used directly as a drive force for the DC motor 10 or motor/generator 1 via the DC link 14.

The rotation speed of the engine 2, transmission torque of the clutch 3, rotation speed of the motor/generator 1 and motor 4, 10, speed ratio of the continuously variable transmission 5 and charging/discharging of the battery 15 are respectively controlled by output signals from a controller 16.

The controller 16 comprises a microcomputer comprising a central processing unit (CPU), read only memory (ROM), random access memory (RAM) and input/output (I/O) interface.

For the battery 15, a lithium ion multi-cell battery having a positive electrode of manganese/ spinel oxide and a negative electrode is used.

Figure 2:
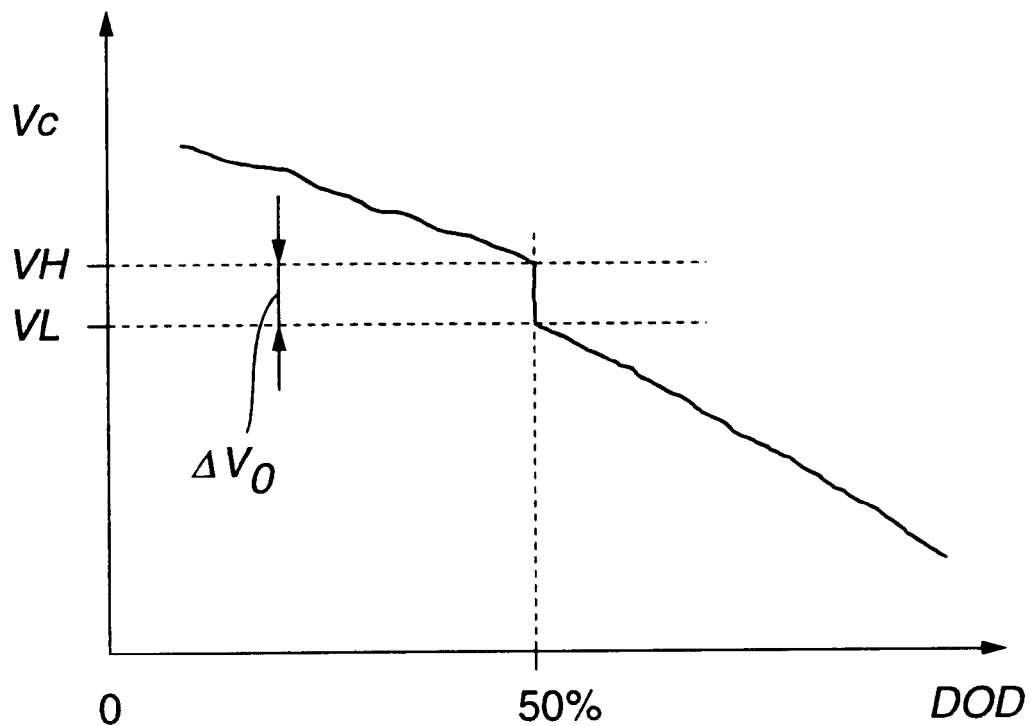
FIG. 2 is a diagram for describing a relation between a depth of discharge DOD and a cell voltage Vc of a manganese spinel type lithium ion cell used in this invention.

The characteristics of the manganese/spinel lithium ion battery will now be described referring to FIG. 2.

This diagram shows the relation between depth of discharge (DOD) and cell voltage Vc of a manganese/spinel lithium ion cell.

When the DOD is about 50%, positive electrode crystal phase transport occurs in the manganese/spinel lithium ion cell, and the cell voltage Vc at this time varies sharply with a width $\Delta V_0$. The value of the variation width $\Delta V_0$ is about 100 mV.

When the battery 15 is being charged, the cell voltage at which the voltage Vc starts to increase sharply due to positive electrode crystal phase transport, i.e., the cell voltage immediately before the positive electrode crystal phase transport, is referred to as a lower limiting voltage VL. Likewise, the cell voltage at which the sharp variation of the cell voltage Vc due to crystal phase transport terminates, i.e., the cell voltage immediately after the positive electrode crystal phase transport, is referred to as an upper limiting voltage VH.

The manganese/spinel type lithium ion cell has characteristics such that, if it is used when the depth of discharge (DOD) is 50% or more, i.e., when the state of charge (SOC) is 50% or less, there is not much deterioration. On the other hand, if it is used when DOD is 50% or less, i.e., when SOC is 50% or more, there is large deterioration.

Figure 3:
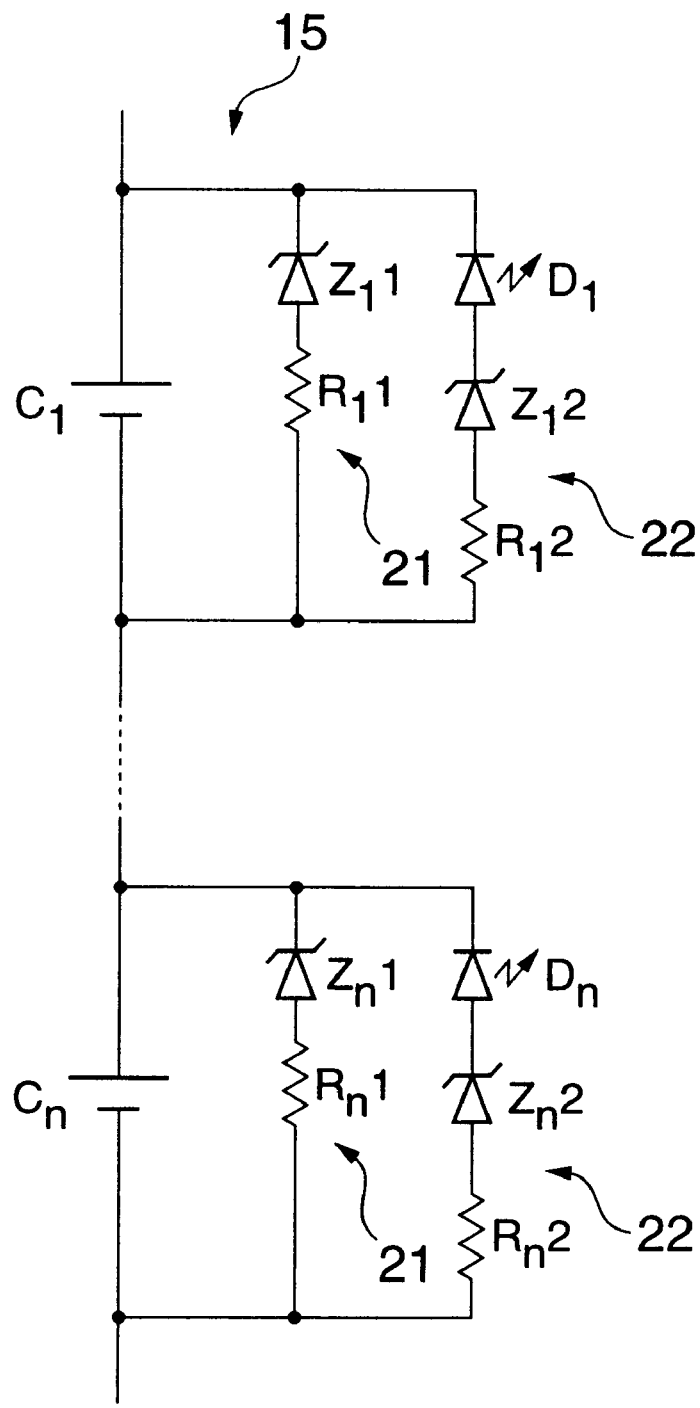
FIG. 3 is an internal circuit diagram of a multi-cell battery according to this invention.

In this hybrid vehicle, where use is made of these characteristics, a bypass circuit 21 of a cell $C_n$ (n is a positive integer) and over voltage detecting circuit 22 are provided using a Zener diode as shown in FIG. 3.

Next, the internal circuit of the battery 15 will be described referring to FIG. 3.

The manganese/spinel lithium ion battery 15 comprises n cells $C_1$–$C_n$ connected in series.

Each cell $C_n$ is connected in parallel to the bypass circuit 21 comprising a Zener diode $Z_n1$ and resistor $R_n1$ connected in series. The cathode of the Zener diode $Z_n1$ is connected to the positive electrode of the cell $C_n$, and the anode is connected via the resistor $R_n1$ to the negative electrode of the cell $C_n$.

Also, in this hybrid vehicle, the Zener diode voltage VZ1 of the Zener diode $Z_n1$ is set to be approximately identical to the lower limiting voltage VL of positive electrode crystal phase transport. Considering that the aforesaid $\Delta V_0$ is 100 mV, VZ1 and VL may be regarded to be approximately identical when VZ1=VL±50 mV.

Figure 4:
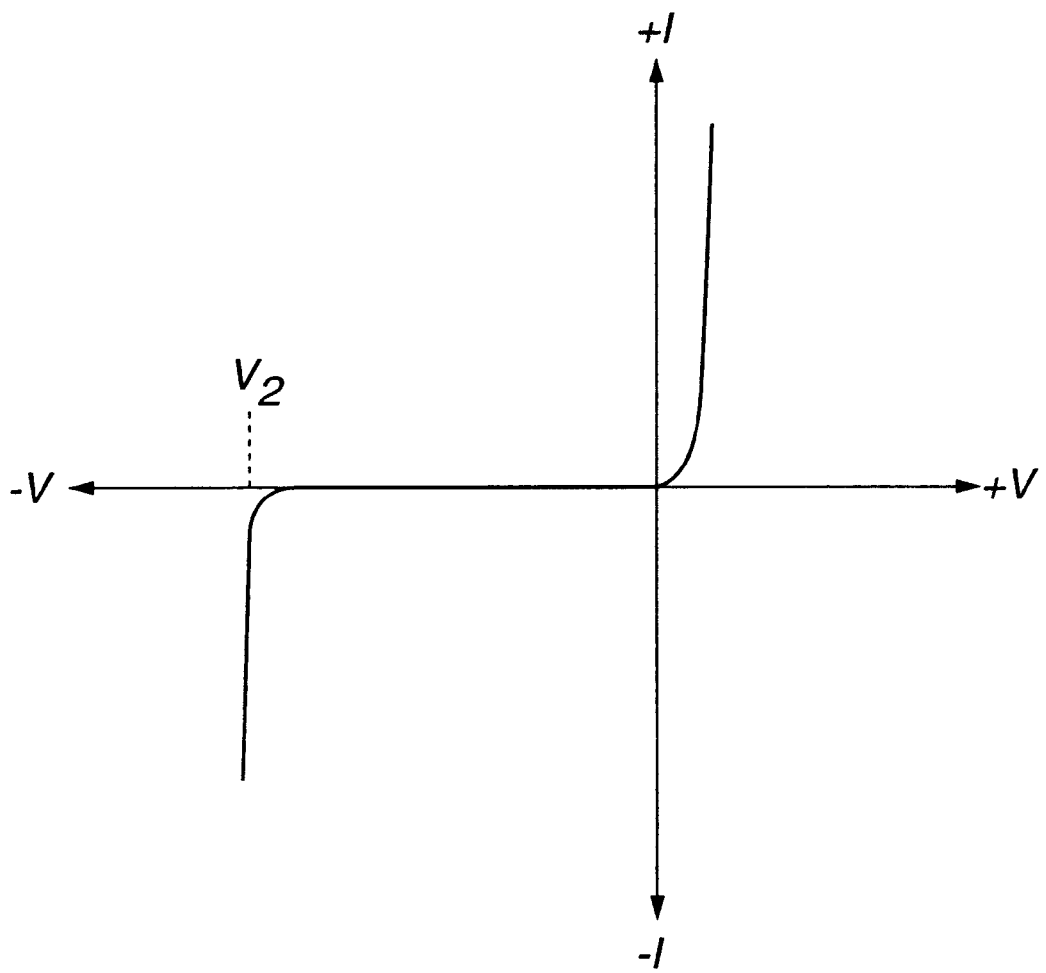
FIG. 4 is a diagram showing voltage and current characteristics of a Zener diode, according to this invention.

If the cell voltage Vc exceeds the lower limiting voltage VL during charging, the reverse current –I of the Zener diode $Z_n1$, i.e., the bypass current which bypasses the cell $C_n1$, sharply increases as shown in FIG. 4.

It may be noted that in a manganese/spinel lithium ion cell, the Zener voltage VZ1 of the Zener diode $Z_n1$ is selected to be in the vicinity of 3.8V.

Therefore, the cell voltage Vc of each cell is substantially below the lower limiting voltage VL, and the charge amount in each cell can be made substantially uniform.

The resistor $R_n1$ is used as an overcurrent protection for the bypass circuit 21, and the value of the resistor is set so that the bypass current flowing into the bypass circuit 21 does not exceed the maximum rated current of the Zener diode $Z_n1$.

Consequently, by providing a bypass route wherein the Zener diode $Z_n1$ and resistor $R_n1$ are arranged in series with each cell $C_n$ of the manganese/spinel lithium ion battery 15, and setting the Zener voltage VZ1 of the Zener diode $Z_n1$ to be substantially the same as the lower limiting voltage VL, the charge amount of the cells $C_n$ when the battery is charged can be made uniform by a simple and economical construction.

The battery 15 is used at or below the depth of charge DOD of 50%, so battery deterioration can be suppressed to the minimum and the lifetime of the battery 15 can be extended.

The resistance of the Zener diodes $Z_n1$ in the reverse direction is high when the voltage applied is equal to or less than the Zener voltage VZ1, so the operating current (dark current) is small, and unwanted discharge from the battery 15 does not easily occur.

According to this embodiment, an overvoltage detecting circuit 22, which comprises a light emitting diode $D_n$, Zener diode $Z_n2$ and resistor $R_n2$ connected in series, is connected to each cell in parallel with the bypass circuit 21. As in the case of the bypass circuit 21, in the Zener diode $Z_n2$, the cathode of the Zener diode $Z_n2$ is connected to the positive electrode of the cell $C_n$, and the anode of the Zener diode $Z_n2$ is connected to the negative electrode of the cell $C_n$.

Also according to this embodiment, the Zener voltage VZ2 of the Zener diode $Z_n2$ in the overvoltage detecting circuit 22 is set to a voltage which is substantially identical to an upper limiting voltage VH of positive electrode crystal phase transport. Considering that the aforesaid $\Delta V_0$ is 100 mV, VZ2 and VH may be regarded to be approximately identical when VZ2=VH±50 mV.

Hence, when the cell voltage Vc exceeds the upper limiting voltage VH during charging, the reverse current –I of the Zener diode $Z_n2$, i.e., the current flowing through the light-emitting diode $D_n$, increases sharply as shown in FIG. 4, and the light-emitting diode $D_n$ lights up.

The resistor $R_n2$ is provided to protect against overcurrent in the overvoltage detecting circuit 22, and is set to such a value that the current flowing through the overvoltage detecting circuit 22 does not exceed the maximum rated current of the Zener diode $Z_n2$.

By connecting a series circuit comprising the light-emitting diode $D_n$, Zener diode $Z_n2$ and resistor $R_n2$ to each cell of the manganese/spinel type lithium ion battery 15, and setting the Zener voltage VZ2 of the Zener diode $Z_n2$ to be substantially identical to the upper limiting voltage VH of positive electrode crystal phase transport of the cell $C_n$, a cell in an overvoltage state can easily and economically be displayed.

Also, the resistance of the Zener diodes $Z_n2$ in the reverse direction is high when the voltage applied is equal to or less than the Zener voltage VZ2, so the operating current (dark current) is small, and unwanted discharge from the battery 15 does not easily occur.

According to this embodiment, a cell in an overvoltage state is displayed by the light-emitting diode Dn, however instead of the light-emitting diode Dn, a signal generating circuit may be provided which outputs a signal when the current flowing through the over voltage detecting circuit 22 reaches or exceeds a predetermined value, this overvoltage signal being sent to the controller 16 to activate a display and an alarm.

The contents of Tokugan Hei 10-132181, with a filing date of May 14, 1999 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

For example, in the above embodiment, the invention was applied to the battery 15 of a hybrid vehicle, but it may also be applied to a battery of any electric vehicle including other types of hybrid vehicles.

Further, it may also be applied to batteries other than those used in electric vehicles.

In the aforesaid embodiment, the bypass circuit 21 and over voltage detecting circuit 22 were connected in parallel with each cell of a multi-cell battery wherein plural cells were connected in series, however, this invention can also be applied to a multi-cell battery wherein plural battery modules, comprising plural cells arranged either in series or parallel, or in a complex configuration of both, are connected in series.

In this case, the Zener voltage of the Zener diode of the bypass circuit 21 and overvoltage detecting circuit 22 is set according to the number of cells in series in the module, and the bypass circuit 21 and overvoltage detecting circuit 22 are connected in parallel with each module.

The embodiments of this invention in which an exclusive property or privilege is claimed are defined as follows:

What is claimed is:

1. A charge amount controller for use with a lithium ion multi-cell battery wherein plural lithium ion cells each of which is provided with a positive electrode of manganese/spinel oxide and a negative electrode are arranged in series, said controller comprising:

a first circuit comprising a first Zener diode and first resistor connected in series, said first circuit being connected between the positive electrode and negative electrode of each of said lithium ion cells, wherein the Zener voltage of said first Zener diode is set to be substantially equal to a cell voltage of a corresponding lithium ion cell when positive electrode crystal phase transport starts in said corresponding lithium ion cell.

2. A charge amount controller as defined in claim 1, wherein a Zener voltage of said first Zener diode is set to be in a range of ±50 mV with respect to the cell voltage of said corresponding lithium ion cell when positive electrode crystal phase transport starts in said corresponding lithium ion cell.

3. A charge amount controller as defined in claim 1, wherein a resistor value of said first resistor is set so that the current flowing through said first Zener diode does not exceed a maximum rated current of said first Zener diode.

4. A charge amount controller as defined in claim 1, further comprising a second circuit comprising a signal generator, a second Zener diode and a second resistor connected in series, said second circuit being connected to each cell in parallel with said first circuit, wherein the Zener voltage of said second Zener diode is set to be substantially equal to the cell voltage of said corresponding cell when positive electrode crystal phase transport terminates in said corresponding cell.

5. A charge amount controller as defined in claim 4, wherein a Zener voltage of said second Zener diode is set to be in a range of ±50 mV with respect to the cell voltage of said corresponding lithium ion cell when positive electrode crystal phase transport terminates in said corresponding lithium ion cell.

6. A charge amount controller as defined in claim 4, wherein said signal generator comprises a light-emitting diode.

7. A charge amount controller as defined in claim 4, wherein a resistor value of said second resistor is set so that the current flowing through said second Zener diode does not exceed a maximum rated current of said second Zener diode.

8. A charge amount control method for a lithium ion multi-cell battery wherein plural lithium ion cells each of which is provided with a positive electrode of manganese/spinel oxide and a negative electrode are arranged in series, said method comprising:

connecting a first circuit between said positive and negative electrodes of each of said cells, said first circuit comprising a first Zener diode and a first resistor connected in series, and setting a Zener voltage of said first Zener diode substantially equal to a cell voltage of a corresponding lithium ion cell when positive electrode crystal phase transport starts in said corresponding lithium ion cell.

9. A vehicle which runs under the power of an electric motor, comprising:

a lithium ion multi-cell battery for supplying power to said motor, said battery comprising plural lithium ion cells connected in series, each of said cells being provided with a positive electrode of manganese/spinel oxide, a negative electrode, and a series circuit comprising a first Zener diode and a first resistor connected in series between said positive and negative electrodes, wherein a Zener voltage of said first Zener diode is set to be substantially equal to a cell voltage of a corresponding lithium ion cell when positive electrode crystal phase transport starts in said corresponding lithium ion cell.

* * * * *